United States Patent [19]
Lauritzen et al.

[11] Patent Number: 5,407,226
[45] Date of Patent: Apr. 18, 1995

[54] INFLATABLE RESTRAINT SYSTEM REACTION CANISTER

[75] Inventors: Donald R. Lauritzen, Hyrum; Larry D. Rose, Layton; David J. Green, Brigham City, all of Utah

[73] Assignee: Morton International, Inc., Chicago, Ill.

[21] Appl. No.: 43,960

[22] Filed: Apr. 13, 1993

Related U.S. Application Data

[63] Continuation-in-part of Ser. No. 840,238, Feb. 24, 1992, Pat. No. 5,332,256.

[51] Int. Cl.6 ............................................. B60R 21/16
[52] U.S. Cl. ................................ 280/728 R; 280/732; 280/739
[58] Field of Search ........... 280/728 R, 728 A, 728 B, 280/732, 736, 738, 739, 740, 741

[56] References Cited

U.S. PATENT DOCUMENTS

| | | | |
|---|---|---|---|
| 3,414,292 | 12/1968 | Oldberg et al. | 280/740 |
| 3,708,181 | 1/1973 | Mazelsky | 280/740 |
| 3,715,131 | 2/1973 | Hurley et al. | 280/736 |
| 3,880,447 | 4/1975 | Thorn et al. | 280/740 |
| 4,332,398 | 6/1982 | Smith | 280/732 |
| 4,547,342 | 10/1985 | Adams et al. | 422/166 |
| 4,561,675 | 12/1985 | Adams et al. | 280/734 |
| 4,817,828 | 4/1989 | Goetz | 222/3 |
| 4,842,300 | 6/1989 | Ziomek et al. | 280/732 |
| 4,941,678 | 7/1990 | Lauritzen et al. | 280/732 |
| 4,964,654 | 10/1990 | Bishop et al. | 280/741 |
| 5,072,967 | 12/1991 | Batchelder et al. | 280/732 |
| 5,259,643 | 11/1993 | Kraft et al. | 280/740 |
| 5,261,693 | 11/1993 | Krickl et al. | 280/732 |
| 5,263,739 | 11/1993 | Webber et al. | 280/732 |
| 5,280,948 | 1/1994 | Henseler et al. | 280/728 A |
| 5,284,358 | 2/1994 | Rhein | 280/728 A |

FOREIGN PATENT DOCUMENTS

| | | |
|---|---|---|
| 0496267A1 | 7/1992 | European Pat. Off. |
| 0529304A1 | 3/1993 | European Pat. Off. |
| 2151938 | 4/1973 | France . |
| 2022194 | 12/1979 | United Kingdom ................ 280/740 |

OTHER PUBLICATIONS

The American Heritage Dictionary Published by Houghton Mifflin Company, p. 223.

Primary Examiner—Margaret A. Focarino
Assistant Examiner—Paul N. Dickson
Attorney, Agent, or Firm—Nick C. Kottis; Gerald K. White

[57] ABSTRACT

Featured for use as a part of a reaction canister of an inflatable restraint system is a reaction canister body part having an integrally shaped inflator holder of partial, generally circular cross section.

20 Claims, 4 Drawing Sheets

INFLATABLE RESTRAINT SYSTEM REACTION CANISTER

CROSS REFERENCE TO RELATED APPLICATION

This application is a continuation-in-part of application, U.S. Ser. No. 07/840,238, now U.S. Pat. No. 5,332,256, filed on Feb. 24, 1992.

BACKGROUND OF THE INVENTION

This invention relates generally to inflatable passive restraint systems for use in vehicles for restraining the movement of a seated occupant during a collision and, more particularly, to an improvement in the structure for housing and positioning a gas generator and inflatable bag in the vehicle.

Safety restraint systems which self-actuate from an undeployed to a deployed state without the need for intervention by the operator, i.e., "passive restraint systems", and particularly those restraint systems incorporating inflatable bags or cushions, as well as the use of such systems in motor vehicles have been the subjects of much discussion as the desirability of the use of such passive restraint systems has gained general acceptance in the United States.

It is well known to protect a vehicle occupant using a cushion or bag that is inflated with gas, e.g., an "inflatable bag" or, commonly referred to as an "air bag", when the vehicle encounters sudden deceleration, such as in a collision. During deployment, the rapidly evolving gas with which the bag is typically filled is an inert gas, e.g., nitrogen. In such systems, the inflatable bag is normally housed in an uninflated and folded condition to minimize space requirements. Upon actuation of the restraint system, gas is discharged from an inflator to rapidly inflate the bag. The bag can then serve to restrain the movement of the vehicle occupant as the collision proceeds.

Vehicular inflatable restraint systems generally include multiple crash sensors generally positioned about or mounted to the frame and/or body of the subject vehicle and serve to sense sudden decelerations by the vehicle. In turn, the sensor sends a signal to an inflatable bag module/assembly strategically positioned within the riding compartment of the vehicle to actuate deployment of the air bag. In general, an inflatable bag provided for the protection of a vehicle driver, i.e., a driver side air bag, is mounted in a storage compartment located in the steering column of the vehicle. Whereas, an inflatable bag for the protection of a front seat passenger, i.e., a passenger side air bag, is typically mounted in the instrument panel/dash board of the vehicle.

Typical inflatable passive restraint systems make use of an air bag module which generally includes an outer reaction housing or canister, commonly referred to as a "reaction can" or, more briefly, as a "can". The reaction canister generally serves to support or contain other components of the air bag module system, including what is referred to as a "air bag inflator" or, more briefly, as an "inflator", or, alternatively, as a "generator". The inflator, upon actuation, acts to provide the gas to inflate the bag.

In addition to providing protection for the gas generator and the inflatable bag until the time of deployment of the latter, the housing structure also acts to absorb the loads generated by the deployment of the bag. Typically, these loads are large and unless sufficiently absorbed can cause damage to the vehicle including, in the case of a passenger side assembly, damage to the dash panel. Thus, it has been a practice in the prior art to use heavyweight structures, particularly steel structures, for housing and positioning an inflator, particularly an inflator for a passenger side assembly, in order to prevent or minimize such damage.

Emphasis on weight reduction in automobiles, however, has created a need, and a demand, for a lighter weight passenger side inflatable passive restraint system. A most significant reduction in the weight of the system can be achieved through the utilization of aluminum rather than a heavy steel material, as used in previous structures, in the reaction canister structure used to house and position the inflator and inflatable bag. The use of aluminum in such inflatable passive restraint systems is disclosed, for example, in commonly assigned U.S. Pat. Nos. 4,547,342, issued Oct. 15, 1985 to Adams et al., and 4,561,675, issued Dec. 31, 1985 to Adams et al.

More particularly, commonly assigned U.S. Pat. No. 4,941,678, Lauritzen et al., issued Jul. 17, 1990, discloses a lightweight housing canister assembly having a design avoiding such bell mouthing. The assembly includes a body part, such as made of by continuous aluminum extrusion. The assembly further includes a tether strap, at the mouth inside the bag. The tether strap serves to: 1) restrict the loading of the reaction canister that is positioned transversely thereto and 2) retain the spreading forces at the mouth of the canister upon bag deployment. This allows the use of a lighter section at the mouth of the canister and eliminates the need for reinforcing flanges along the sides of the canister, which flanges would undesirably increase the weight of the assembly. The structural arrangement of the Lauritzen et al. patent, however, complicates the manufacturing and assembling operations, and moreover, does not allow installation of the inflator as a last operation in the assembly of the module.

Thus, there is a need and a demand for an improved structural arrangement which permits the more widespread usage of lighter weight assemblies.

In addition, while most inflatable passive restraint systems for automobiles contain common basic components including an air bag, an inflator, and a reaction canister, the systems are installed in vehicles of a variety of different sizes and shapes. Further, there are a variety of different types of inflators such as pyrotechnic, stored gas or hybrid inflators, for example and which inflators can take a variety of shapes and/or sizes as the inflators are specifically designed for particular applications.

As a result, there is a need for a reaction canister structure having applicability in a wide variety of applications and in which an inflator selected from a wide variety of inflator devices can be utilized. That is, there is a need for a reaction canister structure that is capable of a more widespread or universal utilization and applicability.

Further, there is a need and a demand for an improved structural arrangement which is conducive to the economical and effective incorporation of various desired features, such as various mounting or attachment preparations, for example, in particular vehicular inflatable restraint system design applications.

Still further, there is a need for such a structural arrangement which permits the installation of an inflator as a last operation in the assembly of a respective air bag module.

SUMMARY OF THE INVENTION

A general object of the invention is to provide an improved structure for use in housing and positioning an inflator and inflatable bag in an inflatable passive restraint system.

A more specific objective of the invention is to overcome one or more of the problems described above.

Another object of the invention is to provide a structure embodying such improvements, specifically, a simple reaction canister assembly which meets the high reliability standards and requirements associated with and prerequisite for use in such safety devices and systems and which at the same time can be manufactured in relatively high production rates and at relatively low cost.

The general object of the invention can be attained, at least in part, through a specifically shaped and/or formed body part. The body part is formed by extrusion and is trough-shaped. The body part includes an integrally shaped inflator holder of partial, generally circular cross section. The body part also has first and second opposite ends and first and second opposite side walls with a plurality of end plate attachment preparations at each opposite end. Such a body part finds use in a lightweight reaction canister for an inflator-containing, inflatable passive restraint system.

The prior art fails to provide a simple, cost effective, and reliable structural arrangement for a vehicular inflatable restraint system and which structural arrangement, for example: 1) permits the more widespread usage of lighter weight assemblies, and 2) is conducive to the economical and effective incorporation of various desired features, such as various mounting or attachment preparations, for example.

The invention further comprehends a lightweight reaction canister for an inflatable passive restraint system. The canister includes an extruded trough-shaped body part having an integral shaped inflator holder, opposite ends, opposite side walls, and a plurality of end plate attachment preparations at each opposite end. The canister further includes first and second end closures attached to a respectively associated opposite end of the body part by means positioned in cooperative relation with the respective end plate attachment preparations. Each of the first and second end plates further include an inflator flange seat positioned to receive and support an associated one of the ends of an elongated inflator gas generator therein.

As used herein, the phrase "thrust neutral" refers to the production by an inflator of zero thrust when initiated as, for example, during a deployment event or accidentally during shipping, storage, or handling thereof. That is to say, the gas discharge openings in the inflator are so positioned that the gas is discharged in opposing directions whereby there are no resulting forces tending to cause physical movement of the inflator. Hence, the inflator will expend the energy generated thereby, generally in place.

Further, references to inflators as "directional" are to be understood to refer the production by an inflator of a resulting directional thrust when initiated as, for example, during a deployment event or accidentally during shipping, storage, or handling thereof. That is to say, the gas discharge openings in the inflator are so positioned that the gas is discharged in one or more directions whereby a resulting force may occur which would tend to cause physical movement of the inflator were not some restraining mechanism incorporated into the assembly.

Other objects and advantages will be apparent to those skilled in the art from the following detailed description taken in conjunction with the appended claims and drawings.

BRIEF DESCRIPTION OF THE DRAWINGS

A detailed description of the invention follows with reference to the accompanying drawings, for which.

DETAILED DESCRIPTION OF THE INVENTION

The present invention, as is described in more detail below, provides an improved reaction canister body part and reaction canister assembly for use in inflatable passive restraint systems for use in vehicles for restraining the movement of a seated occupant during a collision.

While the invention is described hereinafter with particular reference to a passenger side air bag module assembly for automotive vehicles including vans, pickup trucks, and particularly automobiles, it is to be understood that the invention also has applicability not only with other types or kinds of vehicles including, for example, airplanes, but also can, if desired, be used with other types or kinds of air bag module assemblies for automotive vehicles including, for example, driver side assemblies. With respect to automotive vehicles it will also be appreciated that due to usual physical differences between passenger and driver side air bag module assemblies, including the typical difference in size with passenger side air bags generally being much larger than those used in driver side assemblies, the invention is perceived to have particular initial utility in passenger side air bag module assemblies.

Figure 1:
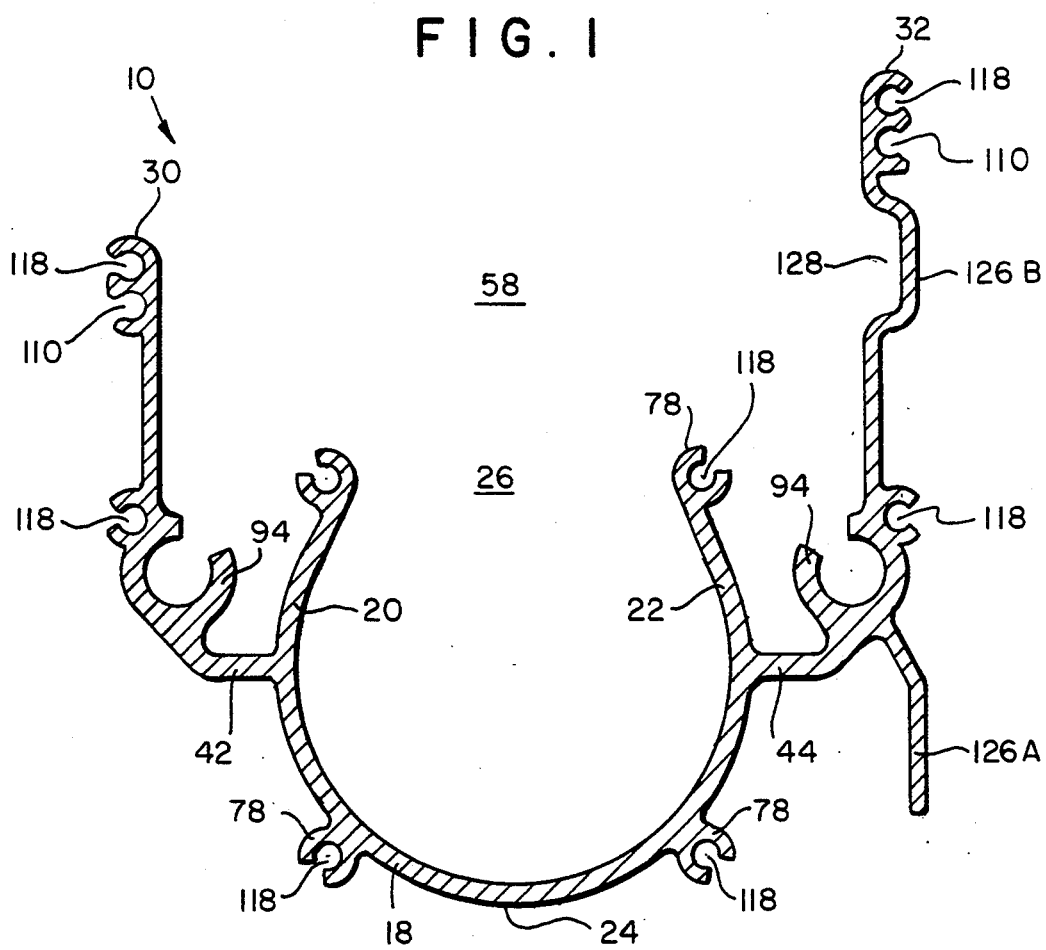
FIG. 1 is a cross sectional view of a reaction canister body part with an integrally shaped inflator holder, in accordance with one embodiment of the invention.
Figure 2:
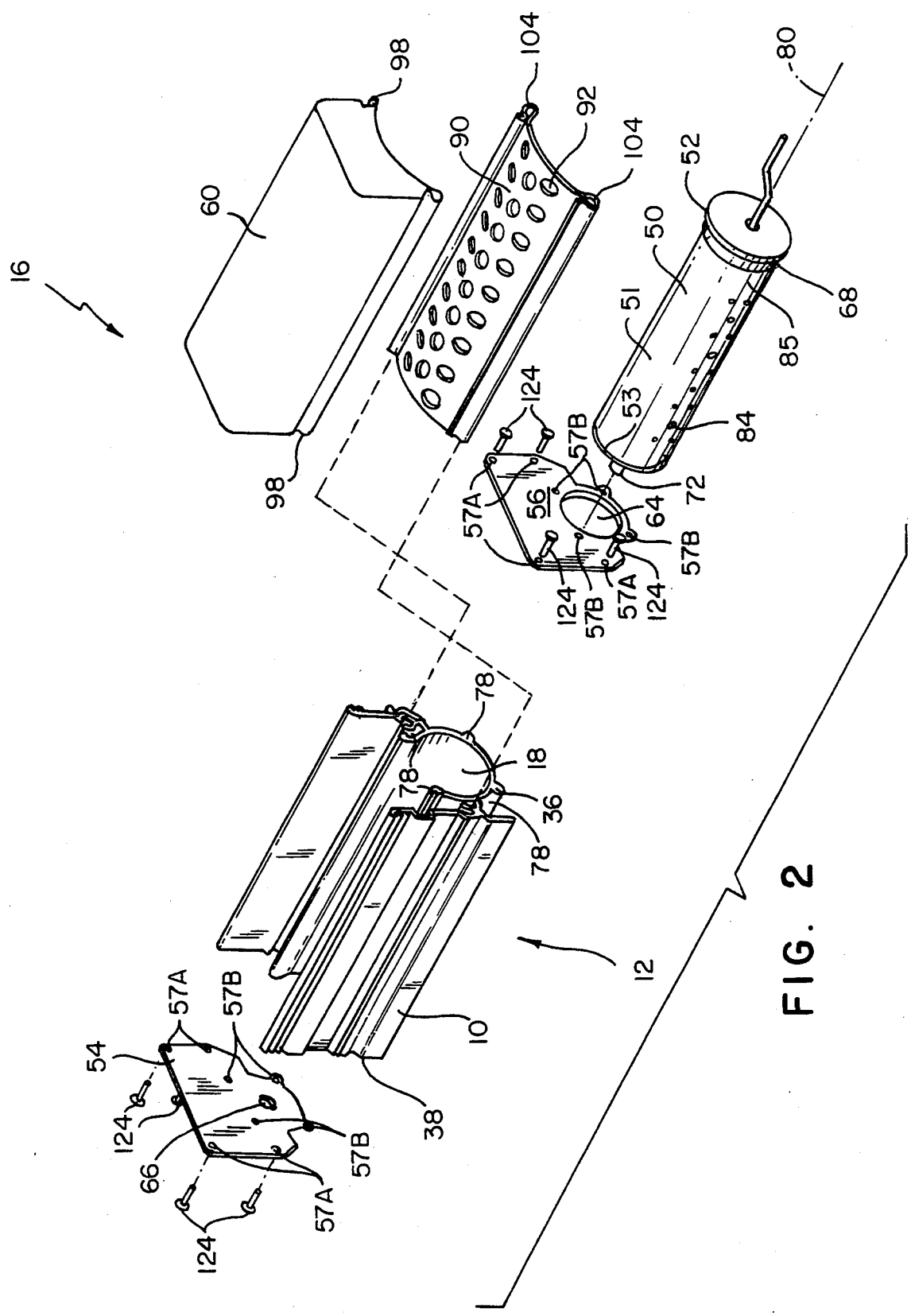
FIG. 2 is an exploded perspective view of an air bag module subassembly in general accordance with one embodiment of the invention, having a reaction canister body part with an integrally shaped inflator holder, as shown in FIG. 1.
Figure 3:
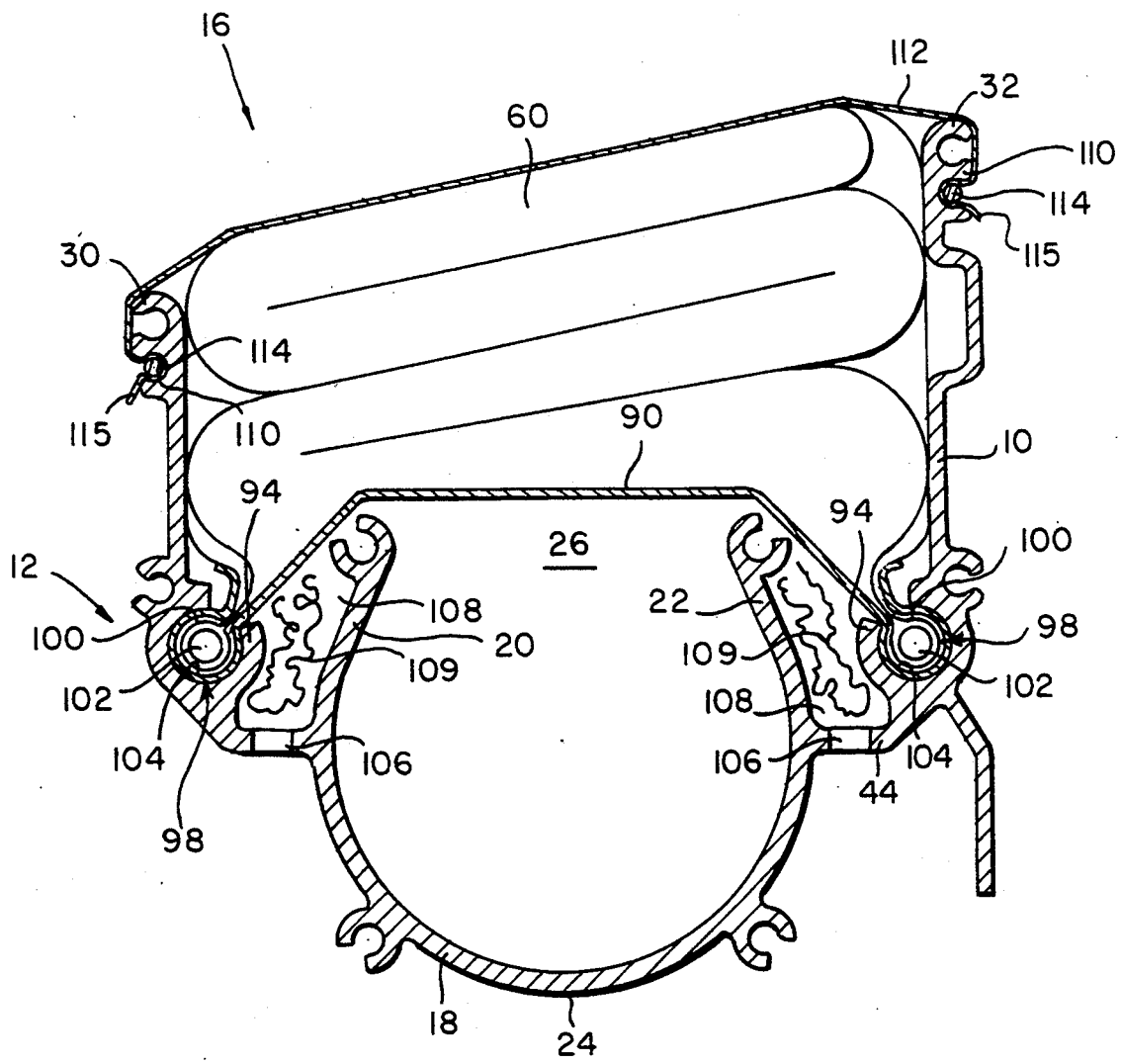
FIG. 3 is a cross sectional side view of the assembled air bag module subassembly of FIG. 2 and showing the inclusion of a) a thermal conductive material within the cooling cavities and b) a protective cover about the outer periphery of the reaction canister air bag retaining cavity.

Referring to the drawings and initially referring particularly to FIGS. 1-3, there is illustrated an extruded reaction canister body part, generally designated by the reference numeral 10, which includes the general form of a long, narrow, open receptacle or trough. The reaction canister body part 10 is shown separately in FIG. 1 and as a part of a reaction canister assembly 12 in an air bag module subassembly, generally designated by the reference numeral 16, in FIGS. 2 and 3. It is to be understood that in the practice of the invention, such an air bag module subassembly can form a component part of a complete module assembly such as are commonly housed in or secured to any appropriate cooperating portion of the vehicle. In the case of a passenger side module installation, such an assembly is normally housed in the instrument panel/dash board (not shown) of the vehicle opposite the passenger seat. In the case of a driver side module installation, such an assembly is typically housed in or secured to the steering wheel.

The reaction canister body part 10 includes an integrally shaped inflator holder 18. The inflator holder 18 is of partial, generally circular cross section, and includes, as a part of an integral structure, first and second side wall portions, 20 and 22, respectively, joined together by way of a concave base portion 24. The inflator holder 18 thereby defines a gap opening, generally designated by the reference numeral 26. In general, as a result of practical limitations in extrusion fabrication such as those involving die tongue ratio and operational limitations such as the body part have an opening sized to permit proper gas flow therethrough while permitting proper spacing and locating of attachment preparations as well as having an inflator holder functioning as a retaining device for an inflator, such an extruded body part having an inflator holder of partial circular cross section will generally include a gap opening of an arc angle of at least about 45°, preferably at least about 90°, and typically no more than about 180°, preferably no more than about 135°.

The reaction canister body part 10 also includes first and second opposite side walls or panels, e.g., a top side wall and a bottom side wall, 30 and 32, respectively, and first and second opposite ends, 36 and 38, respectively (see FIG. 2). The side walls are generally spaced apart and preferably formed directly continuous with the integrally shaped inflator holder 18 or, as shown, continuously formed therewith via side wall connecting portions 42 and 44, respectively.

In the illustrated embodiment, the side walls 30 and 32 are shown as being of different lengths, with the bottom side wall 32 being of a longer length than the top side wall 30. In general, it has been found that reaction canisters so shaped can more conveniently be incorporated within the dash board/instrument panel of automotive vehicles. It is to be understood, however, that the invention is not limited to use in conjunction with reaction canister side walls of such relative length. That is, the invention can similarly be used in conjunction with reaction canister body parts having side walls of similar lengths as well as reaction canister body parts wherein the length of the top side wall exceeds that of the bottom side wall.

As shown by the figures, particularly in FIG. 2, the inflator holder 18 is generally sized, shaped, and adapted for the placement therein of an inflatable restraint system inflator 50 including an inflator chamber portion 51, with the inflator 50 having first and second end portions, 52 and 53, respectively.

To that end and as identified above, the inflator holder will preferably have a generally circular cross section as inflator devices most commonly used in such applications also have an outer cross sectional shape that is generally circular, albeit the inflator holder will typically have a circular cross section of larger diameter than that of the inflator device, permitting the inflator device to be positioned and held therein.

Such an inflator holder also serves as a retaining device for the inflator. That is, the inflator holder side walls 20 and 22 can be appropriately sized and shaped to cooperate with the base portion 24, as may be desired, to result in gap opening 26 being of such a width as to normally not permit an inflator held therewithin to escape from such hold, even when used in conjunction with a directional inflator.

As identified above, the reaction canister body part side walls 30 and 32, respectively, are generally spaced apart and in conjunction with the inflator 50 and a first end plate 54 and a second end plate 56 define an air bag retaining cavity, generally designated by the reference numeral 58. As shown in FIG. 3, an air bag 60, such as folded in a conventional manner, is housed within the cavity 58. In one preferred embodiment and as shown in the figures, the spaced apart side walls 30 and 32 are generally parallel to each other, ensuring a more uniformly shaped air bag retaining cavity and thereby reducing the possibility of the air bag housed within the cavity therebetween undesirably getting caught or snagged such as by a protruding surface or edge of the reaction canister body part. It is to be understood, however, that the side walls can be otherwise angularly positioned relative to one another as may be desired in specific applications, such as to permit the accommodation of the reaction canister into a specifically shaped dash board or instrument panel opening.

The inflator 50 has an elongated cylindrical configuration comprising an inflator chamber 51, as shown in FIG. 3, and is held in the inflator holder 18, in concentric relation therewith, between the end plates 54 and 56. As will be described in more detail below, each of the end plates, 54 and 56, respectively, includes a number of fastener holes 57. (Fastener holes 57A can be used for attachment of the end plates to the body part 10 and fastener holes 57B can be used, if desired, for the attachment of an inflator device into the assembly.)

In order to allow the inflator to be inserted into the inflator holder as a last operation in the assembly process, a circular opening 64 is provided in the second end plate 56 and a smaller keyed slot opening 66 is provided in the first end plate 54. Also, as shown, a flange 68 is provided on the first end 52 of the inflator 50 and a threaded keyed stud 72, such as is common to such inflator devices, is provided on the second end 53 of the inflator 50. The size of the opening 64 is such as to allow the second end 53 of the inflator 50 to be inserted therethrough with the flange 68 at the first end 52 mating with the second end plate 56 about the opening 64. If desired, such as in order to further secure an inflator within the assembly, for example, the inflator device can be provided with fastener holes (not shown), such as in the base flange of the inflator and such as will align with the fastener holes 57B, such as in either or both of the end plates 54 and 56, and the end base attachment preparations 78 in the respective end 36 or 38 of the reaction canister body part 10. Thus through the use of a selected fastener, such as a screw, bolt, rivet or the like, in cooperation with the fastener holes in the end plate and in the inflator base flange and the end base attachment preparations in the reaction canister body part, the joinder of the inflator within the assembly can be further or, if desired, alternatively secured.

Similarly, the size of the keyed opening 66 is such as snugly receive the stud 72. The arrangement is such that the relative angular position of the inflator 50 about the longitudinal axis 80 thereof and within the reaction canister body part 10 is determined by the keyed opening 66 and the keyed inflator stud 72. A nut (not shown) can be placed on the stud 72 so as to serve to hold the end plates 54 and 56 against first and second ends, 52 and 53, respectively, of the inflator 50.

The inflator 50 also includes gas exit vents or ports 84 along at least one side, denominated side 85, and whereby gas is discharged from the inflation chamber 51 and can be directed for inflation of the air bag 60, as can more easily be seen by reference to FIGS. 2 and 3.

To assist in producing or forming a more uniform or orderly distribution of gas into the inflating air bag and whereby a more uniformly and/or orderly deployment of the inflating air bag can be effected, one or more flow directing devices can be incorporated within the reaction canister assembly. For example, such flow directing devices can take the shape or form of baffles or gas port passages of particular size, shape and/or arrangement.

In one preferred embodiment of the invention, such flow directing devices can take the form of and/or include an air bag retainer/diffuser device 90, as shown in FIGS. 2 and 3. The air bag retainer/diffuser device 90 includes a plurality of openings 92 therein to permit the passage of gas therethrough. The openings 92 are located and sized so as to provide a desired distribution of gas into the air bag 60.

A preferred such device or system for use in the practice of the invention is a retainer device/system such as described in commonly assigned U.S. patent application Ser. No. 07/993,280, filed on Dec. 18, 1992, and which device/system incorporates diffuser face member features such as described in commonly assigned U.S. patent application Ser. No. 07/993,277, also filed on Dec. 18, 1992, the text of which applications are fully incorporated herein by reference. As disclosed therein, the size, geometry, and arrangement of the gas passage openings can be appropriately designed to satisfy specific application needs and the invention is not necessarily limited to use with a diffuser with gas passage openings of any specific configuration. Further, as disclosed therein, such a diffuser device/system, in addition to fostering desired gas diffusion can also assist in: 1) facilitating module assembly; 2) maintaining proper air bag retention within the assembly, and 3) maintaining desired separation of the hot inflator surfaces from both the surface of the air bag as well as from contact by the vehicle occupants. For example, relative to the retaining of an air bag within the assembly, such a means of retaining an air bag can advantageously avoid or minimize the need for conventional fastener devices such as screws or rivets, for example.

In addition, a diffuser device/system, such as the air bag retainer/diffuser 90, can serve to facilitate control of bell mouthing of the reaction canister, thereby assisting in maintaining the integrity of the reaction canister.

To that end, the reaction canister body part 10 includes, as a part of the side walls 30 and 32, integrally formed attachment sleeves 94. As will be described in more detail below with reference to FIGS. 2 and 3 and as fully described in the above-referenced U.S. patent application Ser. No. 07/993,280, such attachment sleeves allow for the fastenerless attachment of an air bag within an inflatable safety system. It is to be understood, however, that the practice of the subject invention in its broader aspects is not limited to use with such attachment sleeves and that, if desired, an alternative form of air bag retention/diffuser attachment preparation can be used, such as those that include fastener devices such as screws or rivets, such as described in the above-referenced U.S. patent application, Ser. No. 07/993,277. Further, it is to be understood that, if desired, the invention can be practiced via the utilization of a cushion retainer, such as disclosed in the above-referenced U.S. patent application Ser. No. 07/993,280, which device serves to retain an air bag (e.g., a cushion) within the assembly while minimizing or, preferably, avoiding the use of fasteners such as screws or rivets, does not necessarily incorporate diffuser features with such retainer device. Also, it is to be understood that, if desired, the invention can be practiced both without the utilization of the referenced diffuser features and while making use of common forms of air bag attachment, such as the use of fasteners such as screws and/or rivets, for example.

As is known in the art, air bags in inflatable restraint systems can include one or more vent holes (not shown) therein whereby gases can desirably be vented out of the air bag. Such air bag vent holes can advantageously assist in post deployment venting of the air bag both immediately after a crash event (e.g., as may be desired to soften the bag upon contact by a vehicle occupant thereby resulting in a greater cushioning effect and to reduce the likelihood or extent of rebound by such vehicle occupant upon such contact) and subsequent thereto (e.g., as may be desired to facilitate the exiting from the vehicle by the occupant subsequent to the deployment event).

As perhaps more clearly seen by reference to FIGS. 2 and 3, the air bag 60 has a thickened peripheral edge 98. Such thickening of an air bag is described in the above-referenced U.S. patent applications, i.e., Ser. Nos. 07/993,277 and 07/993,280, and can take the form, as shown, of a hemmed loop 100 of air bag material at the gas inlet opening edge of the air bag 60 and into which loop, a selected bead material 102 is placed to better ensure positive engagement of the air bag 60 into the assembly 16. The air bag retainer/diffuser device 90 includes a channel 104 thereabout wherein the thickened peripheral edge 98 of the air bag 60 can be secured to form an air bag/diffuser subassembly for joinder to a reaction canister body part, as shown and as described in detail in the above-referenced patent applications.

As disclosed in the above-referenced patent application, U.S. Ser. No. 07/993,277, the bead material can suitably be fabricated from a wide range of materials such as metal or, preferably, plastic, especially an extruded thermoplastic and can take various shapes or forms to meet the needs of particular applications.

To assist in effecting desired air bag venting, the illustrated reaction canister body part 10 further includes canister vent holes 106 about the side wall connecting portions 42 and 44, respectively (see FIG. 3). Such canister vent holes allow for "behind the bag venting", whereby gas is vented from the canister in a rearward fashion thereby minimizing the likelihood of contact between the vented gas and the vehicle occupant. In addition, such canister vent holes permit a leveling off the breakout pressure, e.g., the pressure at which an air bag initially being deployed breaks out through the cover layer of the assembly, such as from the air bag retaining cavity and into the interior of the vehicle, for example.

In the illustrated embodiment, the reaction canister body part 10 forms gas cooling cavities 108 wherein vented gases can suitably be cooled. Further, as shown in FIG. 3, a thermal conductive material 109 can be placed within the cooling cavities 108 to assist in the cooling of, e.g., removal of heat from, the gases vented out from the air bag. Such a thermal conductive material preferably has a large surface and is capable of absorbing large amounts of heat while permitting the vented gas to be passed therethrough. The so positioned thermal conductive material thus functions to assist in retaining generated or resulting heat within the confines of the reaction canister and thus away from the vehicle occupant. For example, such a thermal conductive material can take the form of a metallic wool such as steel wool or, more preferably, due to the relatively greater heat conducting ability and lighter weight of aluminum, an aluminum wool.

As perhaps more clearly seen in conjunction with FIG. 3, the body part 10 further includes protective cover retaining preparations 110, shown as taking the form of slots about the outer extremity of each of the side walls 30 and 32, respectively. A protective cover 112 such as of fiber reinforced paper, for example, can be included as a part of the air bag module subassembly 16 in the form of a wrap joined to the reaction canister body part 10 about the air bag 60 within the air bag retaining cavity 58 of the subassembly 16. Such a protective cover 112 can be secured to the reaction canister body part 10 such as with an elastic band or other selected bead material 114 placed about the outer edge 115 of the protective cover 112, with the bead material secured within such a protective cover retainer slot preparation 110. Such a protective cover serves to help protect the air bag from damage such as by accidental or other undesired contact such as by or with other elements of the inflatable restraint system as well as extraneous elements in the environment to which the air bag can be exposed. Also, such a protective cover serves to desirably keep debris out of the reaction canister assembly.

In practice, such a protective cover is preferably fabricated of a tough, wear and normally tear resistant material which can be preferably broken or ruptured at predetermined or selected sites such as through the aid of perforations therein. For example, such a protective cover can be fabricated of fiber reinforced paper, such as that sold by E.I. Du Pont de Nemours Co. under the name TYVEK. It is to be understood, however, that other appropriate materials such as having such described or preferred properties or characteristics can also be used.

Also, the reaction canister body part 10 includes a plurality of end closure attachment preparations 118, including the above-identified end base attachment preparations. Such attachment preparations can take the form of a hollow or, as the body part is preferably prepared by extrusion fabrication, such attachment preparations can preferably take the form of a groove or what is commonly referred to in the extrusion field as a "screw slot." It is to be understood, however, that the attachment preparations and the form of attachment are not limited to the use of screw fasteners.

As shown, such attachment preparations 118 are preferably spaced about the periphery of the body part 10, both along the side walls 30 and 32, and about the inflator holder 18 so as to ensure secure attachment of end closures 120 (see FIG. 2) to the reaction canister body part 10 and with such attachment preparations preferably at least at each of the opposite ends 52 and 53, thereof. In general, the end closures 120 retain the cross sectional shape of the reaction canister body part 10.

In the air bag module assembly of the invention, the end closures can take the form of end plates. As will be described in more detail below, fasteners 124, such as swaging screw fasteners, can be used in securing such end closures in the assembly.

The reaction canister body part 10 can also include one or more mounting portions, generally designated by the reference numeral 126. Such mounting portions can be either of an external type, i.e., for mounting of the reaction canister body part within a selected vehicle, or an internal or semi-internal type, i.e., for mounting of items to or within the reaction canister body part. As is to be understood and as will be apparent to those skilled in the art, an external mounting portion, such as the mounting bracket 126A, can be appropriately positioned, orientated, shaped, and sized as desired to effected the desired result. Further, an internal or semi-internal type mounting portion, such as the mounting bracket 126B, can be extruded as a segment of a side wall, e.g., the side wall 112. Such a mounting bracket 126B can, for example, be used in the formation of a cavity or recess 128 useful in distancing and shielding the air bag from fastening nuts or other elements used in the reaction canister assembly.

Figure 4:
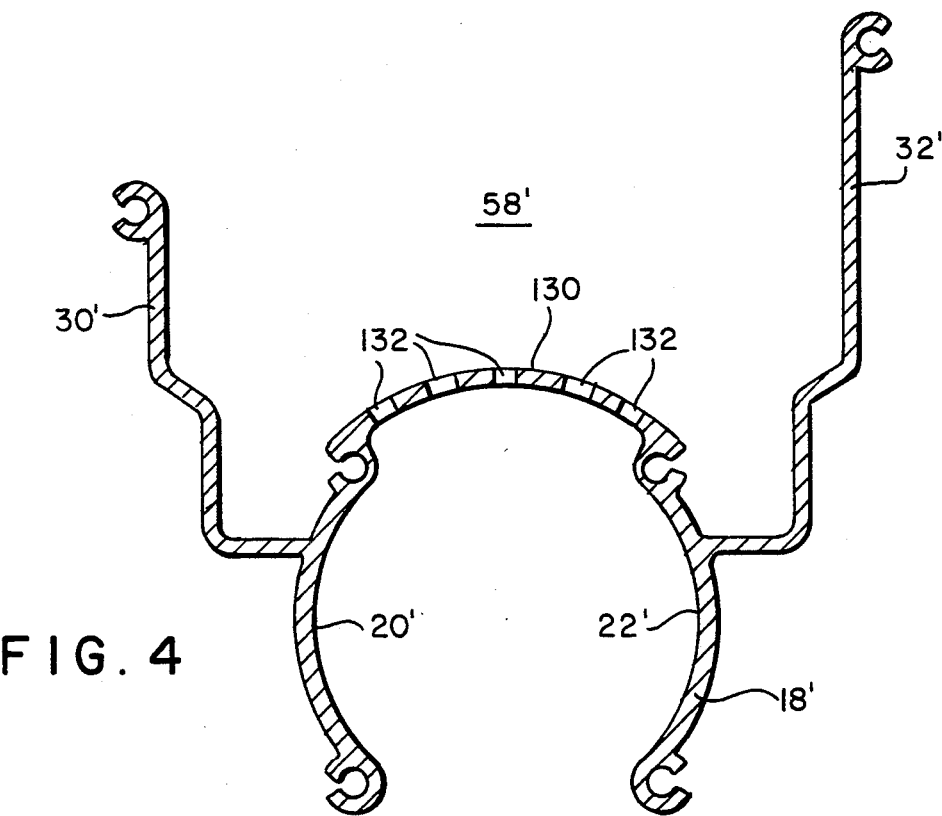
FIG. 4 is a cross sectional view of a reaction canister body part with an integrally shaped inflator holder, in accordance with an alternative embodiment of the invention.

FIG. 4 illustrates a reaction canister body part 10' in accordance with an alternative embodiment of the invention. As with the reaction canister body part 10 of FIGS. 1–3, the reaction canister body part 10' includes an integrally shaped inflator holder 18' of partial, generally circular cross section, with first and second opposite side walls or panels, e.g., a top side wall and a bottom side wall, 30' and 32', respectively, and forms an air bag retaining cavity 58' therebetween.

The inflator holder 18' of reaction canister body part 10', similar to the inflator holder 18 of reaction canister body part 10, is of partial, generally circular cross section. The inflator holder 18' differs, however, in that inflator holder 18' includes a diffuser portion 130 bridging and joining the inflator holder side walls, 20' and 22', respectively. As shown, such bridging diffuser portion is preferably integrally formed as a part of the reaction canister body part and, as will be described in more detail below, permits the passage of gas therethrough.

In general, such a diffuser portion 130 bridges an arc of at least about 30°, preferably an arc of at least about 45°, more preferably an arc of at least about 90°, and generally even more preferably an arc of at least about 120°, between the inflator holder side walls, 20' and 22', respectively, so as to provide sufficient width to the diffuser portion to properly interface between the inflator chamber and the air bag.

In general, extrusion fabrication processing of parts is not well suited to the fabrication of irregularly shaped parts which include a hollow. Therefore, it is desirable to avoid the presence of a hollow form in the part to be extruded. To this end, the inflator holder 18', as it includes a diffuser portion 130, preferably does not include a base portion, such as would result in a hollow form.

The integral diffuser portion includes a plurality of openings 132 therein to permit the passage of gas therethrough. The openings 132 can be located and sized so as to provide a desired distribution of gas into the air bag (not shown). Moreover, it is also to be understood that while the reaction canister body part 10' is shown without integrally formed attachment sleeves, such attachment sleeves can, if desired, be incorporated therewith and an air bag retainer/diffuser or diffuser device, such as are described above, can be used in combination with such a body part having an inflator holder with an integral diffuser chamber, if desired. For example, such combination can find utility in tailoring such a reaction canister body part for various specific applications such as may require a particular distribution of gas into an air bag.

Alternatively, for a reaction canister structure such as that shown in FIG. 4, it is to be understood that fastener holes can be appropriately formed in the side walls and/or end plates of the assembly and air bag can be attached thereto such as by fasteners, passed through such fastener holes, and with or without locking nuts.

While, as discussed above, the reaction canister body part 10, shown in FIGS. 1-3, can in general find application in conjunction with inflators of various design including both thrust neutral and directional inflators, the reaction body part 10', shown in FIG. 4, as it does not totally enclose the inflator will preferably be utilized with a directional inflator wherein the gas exit vents are directed towards the diffuser portion of the inflator holder such that gases can properly be directed towards the inflating air bag.

Figure 5:
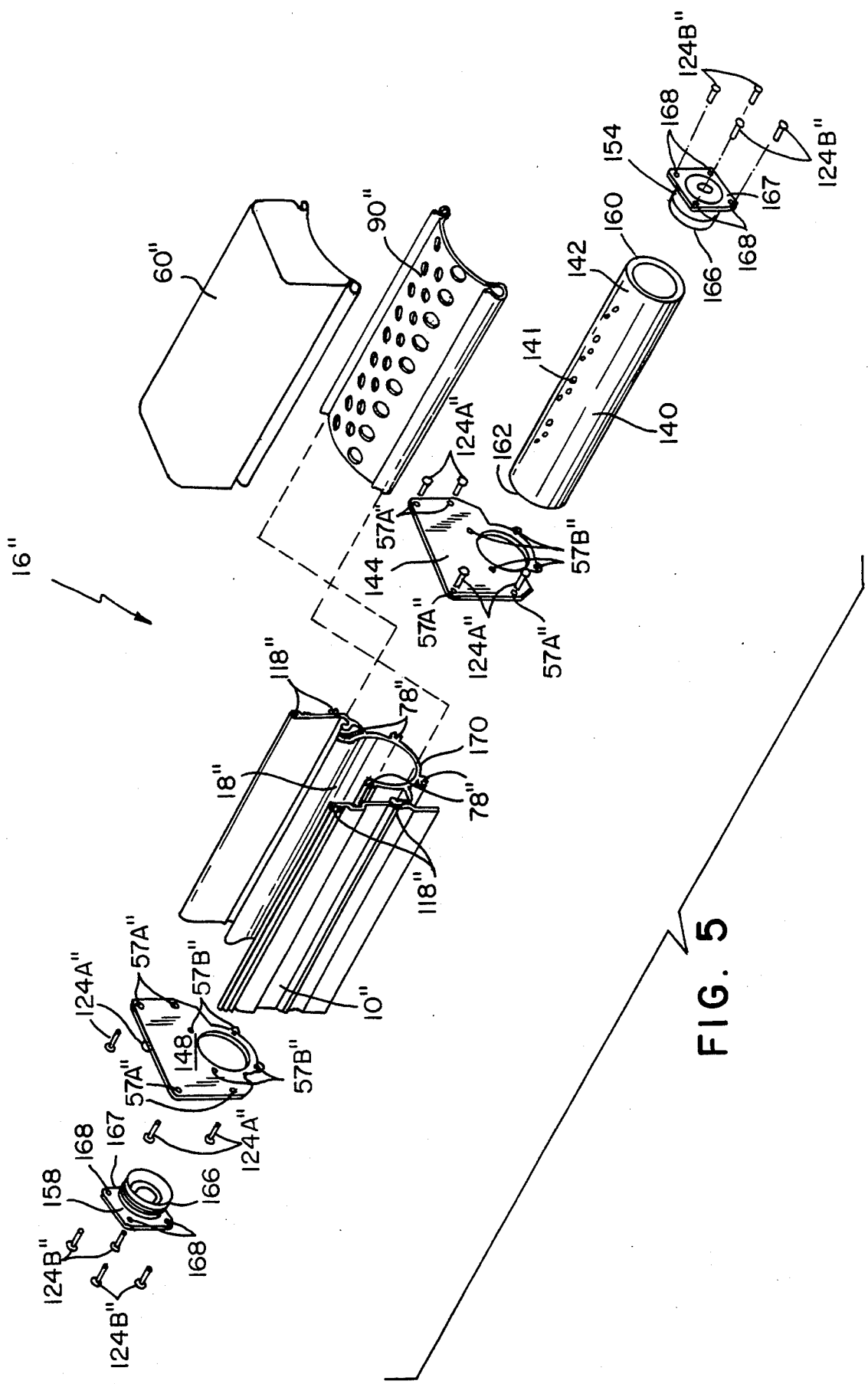
FIG. 5 is an exploded perspective view of an air bag module subassembly in general accordance with an alternative embodiment of the invention, having an inflator device comprising an inflator chamber tube.

In embodiments shown in FIGS. 1-4, the end plates primarily serve to enclose the ends of the air bag retaining cavity formed by the reaction canister body part and serve to secure the inflator therein. FIG. 5 illustrates an embodiment of the invention utilizing a different form of end closure. In FIG. 5 is illustrated an air bag module subassembly 16" in general accordance with an alternative embodiment of the invention, having a reaction canister body part 10" with an integrally shaped inflator holder 18", an air bag 60" and an air bag retainer/diffuser device 90", as shown in FIG. 1, and rather than using a conventional inflator device structure, such as the inflator 50 shown in FIG. 2, makes use of an inflator chamber tube 140 having gas exit vents 141 along a side 142 thereof.

The air bag module subassembly 16" utilizes end closures which include end plates 144 and 148, which primarily serve to enclose the ends of the air bag retaining cavity, and end bases 154 and 158, which primarily serve to provide closure to the ends 160 and 162 of the inflator chamber tube 140. The end bases 154 and 158 each include a mating face 166 to properly receive or join with a respective end of the inflator chamber 140 to provide closure thereto. The end bases 154 and 158 each also include a base flange 167 having fastener holes 168 therein.

In order to simplify and reduce the number of parts required in the assembly, at least some of the fasteners can be used to simultaneously secure both end plates and end bases. Thus, the fasteners denominated 124B" are used in simultaneously securing both end plates and end bases, while the fasteners denominated 124A" are used to secure end plates and not end bases.

In such an assembly, the end bases 154 and 158 preferably comprise thicker and/or stronger materials than used in the end plates 144 and 148 as the end closures at the inflator chamber ends 160 and 162 will typically be subjected to significantly greater pressures than the end closures of the air bag retaining cavity. Similarly, the attachment preparations used for securing such end bases to the assembly typically must be able to withstand such significantly greater pressures. To this end, in the illustrated embodiment, the end closure attachment preparations for use in attaching the end bases 154 and 158 to the reaction canister body part, e.g., the end closure attachment preparations designated 78" and generally in the form of four screw slots relatively equally spaced about the exterior surface 170 of the inflator chamber 18", and the fasteners used in combination therewith, i.e., the fasteners 124B", are of both a larger diameter and the fasteners are of a greater length than the end closure attachment preparations and fasteners, i.e., the preparations 118" and the fasteners 124A", that are used solely in securing the end plates 144 and 148 to the reaction canister body part 10".

Thus, the fasteners 124B" will in cooperative fashion with the fastener holes 168 and 57B" and attachment preparations 78" join the end bases (154 and 158), the end plates (144 and 148) and the reaction canister body part 10". Similarly, the fasteners 124A" will in cooperative fashion with the fastener holes 57A" and attachment preparations 118" join the end plates (144 and 148) and the reaction canister body part 10".

Thus, the invention provides assembly and production flexibility while providing for the relatively inexpensive, yet secure attachment of end closures.

Such an assembly permits and facilitates the use of a wide variety of materials for construction of the inflator chamber. For example, the inflator chamber can be manufactured using a variety of high strength alloyed aluminum materials, such as the 2000 and 7000 series of aluminum. Thus, whereas common aluminum materials used in reaction canister fabrication have a strength of about 30,000-40,000 psi yield, such high strength alloyed aluminum materials are up to 30-70 percent stronger (as measured in terms of psi yield). This permits the use of a thinner walled inflator chamber, as compared to an inflator chamber designed for the same pressure application and using a lower strength material. Further, such an assembly permits and facilitates the use of inflator chambers tubes prepared by seamless fabrication such as by being extruded or drawn. Thus, the invention permits and facilitates the use of standard, prepared tubes for the inflator chamber used therein.

Also, as will be appreciated, the number and location of such attachment preparations can be appropriately altered, as desired, to satisfy the needs of specific applications.

It is further to be understood, however, that the invention is not limited to use with such end closures or such means of attachment and that other forms of closure and means of attachment including swaging and welding processes such as inertial and M.I.G. welding, for example, can be used, as desired.

In its broader applications, the present invention is not limited by the type or mode of operation of the inflator used therewith. Thus, if desired, the invention can be practiced with inflators such as a pyrotechnic, stored gas, or hybrid inflator, for example.

Further, the practice of the invention using the reaction canister body part 10 having the inflator holder 18, such as shown in FIGS. 1-3 and wherein the inflator is totally contained within the body part 10, permits the use of directional as well as thrust neutral inflators therewith as the base portion of the inflator holder can properly assist in directing gas towards the opening and thus to the air bag.

Still further, the present invention is not limited by the internal components of the inflator chamber 51 and the composition and form of the gas generant material housed therein and which may be any of a number of known constructions/formulations such as are commercially available. By way of example and not limitation, such internal components may comprise that disclosed in commonly assigned U.S. Pat. No. 4,890,860 granted to F. E. Schneiter of Jan. 2, 1990.

The reaction canister body part of the invention is preferably fabricated by a continuous extrusion of an extrudable material, such as magnesium or, preferably, aluminum; which material is able to withstand the high temperatures and pressures to which such body part would typically be subjected to in such inflatable restraint system applications. Such extrusion fabrication of the body part permits and facilitates the incorporation into the design thereof, as needed or desired, of various design features and/or characteristics. As described above, such design features/characteristics can, for example, include as desired or needed one or more of the following: diffuser and/or air bag retainer attachment preparations, vent holes to facilitate desired gas venting, cooling cavities to permit desired gas cooling, protective cover retaining preparations to facilitate the retaining of a protective cover about the assembly, end closure attachment preparations whereby the attachment of end closures such as end plates or end plate/end base combinations to the reaction canister body part can be simplified, and mounting portions (both external, e.g., for mounting of the reaction canister body part within a selected vehicle, and internal or semi-internal, e.g., for mounting of items to or within the reaction canister body part).

Further, such extrusion fabrication of the body part permits the rapid fabrication of the body with the added advantage that the extrusion can be cut to varying lengths to permit incorporation thereof in variously sized assemblies.

In order to counteract the forces, described above, to which a reaction canister will typically be subjected to during air bag deployment and which forces can result in undesired bell mouthing of the reaction canister, which in turn can result in the surrounding instrument panel structure or components, it is generally desirable that the reaction canister be relatively rigid. In practice, a reaction canister body part incorporating one or several of the features described above will have increase rigidity as a result of the shape and forms added to effect the incorporation of the features therein. It is to be understood, however, that if additional rigidity is desired, it can be incorporated into the assembly and the parts thereof such as through the addition of selected stiffening ridges or flanges, not shown, either as a part of the reaction canister body part extrusion or added thereto such as by welding.

The swaging screw is a form of fastener that has been found to have particular utility in the practice of the invention. A swaging screw fastener generally forms or swages a thread into a fastener hole or other attachment preparation upon insertion. (The swaging process produces a removal torque in excess of 80% of the screw setting torque.) Such thread formation generally occurs as a result of a stretching or a displacement of the material, typically metal, into which it is inserted, as opposed to a general removal of such material as commonly occurs when using a conventional thread cutting screw fastener. Also, as the fasteners are for use in conjunction with component parts of a vehicular inflatable restraining system, the use of a thread cutting screw fastener can result in the formation of fine metal filings which are undesirable and not easily removed. In contrast, as described above, such metal filings are generally not created with swaging screw fasteners. The use of swaging screw fasteners allows the attachment preparations in the reaction canister body part of the invention to be formed by simple extrusion during the manufacture process, with the swaging screw fastener forming the threading during insertion.

As will be apparent to those skilled in the art and guided by the teachings provided herein, other forms of fasteners such as rivets, bolts, or other screw fasteners, for example, can, if desired, be used in the practice of the invention. A primary consideration in the selection of a fastener and the material of construction used therefore, however, is that the fastener can appropriately operate under the pressures to which it will be subjected, e.g., during inflation gas discharge, pressure within the reaction canister can reach as high as about 400 psi.

In view of the above, it will be appreciated that the reaction canister structure of the invention has applicability in a wide variety of applications. Further, as discussed above, the reaction canister structure of the invention is one in which an inflator selected from a wide variety of inflator devices can be utilized. Thus, the reaction canister structure of the invention is one that is capable of widespread utilization without departing from the basis of the invention.

The foregoing detailed description is given for clearness of understanding only, and no unnecessary limitations are to be understood therefrom, as modifications within the scope of the invention will be obvious to those skilled in the art.

What is claimed is:

1. A trough-shaped body part for a lightweight reaction canister for an inflator-containing, inflatable passive restraint system, said body part being a one-piece structure formed by extrusion fabrication comprising:
    an inflator holder having a generally circular cross section extending less than 360° wherein in an inflator-containing, inflatable passive restraint system, an inflator chamber tube is held in coaxial relation, said body part having first and second opposite ends and first and second opposite side walls with a plurality of end plate attachment preparations at each opposite end, said body part side walls being substantially parallel to each other and spaced apart to define an air bag retaining cavity with said body part side walls having a length greater than the distance said inflator holder projects into said air bag retaining cavity.

2. The trough-shaped body part of claim 1 wherein said inflator holder comprises first and second side wall portions joined together by way of a concave base portion and wherein said inflator holder defines a gap opening.

3. The trough-shaped body part of claim 2 wherein said gap opening is of at least about 45°.

4. The trough-shaped body part of claim 1 wherein said inflator holder comprises first and second side wall portions joined together by way of a diffuser portion which permits the passage of gas therethrough.

5. The trough-shaped body part of claim 4 wherein said diffuser portion bridges an arc of at least about 30° between said first and second side wall portions of said inflator holder, as measured relative to said cross section.

6. The trough-shaped body part of claim 4 wherein said diffuser portion bridges an arc of at least about 120° between said first and second side wall portions of said inflator holder, as measured relative to said cross section.

7. The trough-shaped body part of claim 1 wherein at least one of said first and second opposite side walls additionally comprises at least one attachment sleeve preparation adapted for the attachment to said body part of at least one device selected from the group consisting of an air bag retainer, a diffuser, and a combination air bag retainer and diffuser.

8. The trough-shaped body part of claim 1 additionally comprising at least one integrally formed mounting portion of an external type for mounting of said reaction canister body part into a vehicle.

9. The trough-shaped body part of claim 1 additionally comprising at least one integrally formed mounting portion forming a shielded cavity within said reaction canister body part.

10. A trough-shaped body part for a lightweight reaction canister for an inflator-containing, inflatable passive restraint system, said body part being a one-piece structure formed by extrusion fabrication comprising:
   an inflator holder having a generally circular cross section extending less than 360° wherein in an inflator-containing, inflatable passive restraint system, an inflator chamber tube is held in coaxial relation, said body part having first and second opposite ends and first and second opposite side walls with a plurality of end plate attachment preparations at each opposite end, said body part side walls being spaced apart to define an air bag retaining cavity and wherein said body part side walls are joined to said inflator holder by connecting portions, wherein said body part forms at least one gas cooling cavity adjacent one of said connecting portions with said adjacent connecting portion including at least one gas vent hole permitting the venting of gas from said cooling cavity.

11. The trough-shaped body part of claim 10 wherein said cooling cavity contains a thermal conductive material.

12. A lightweight reaction canister assembly for an inflatable passive restraint system, comprising:
   an extruded One-piece trough-shaped body part including an inflator holder, opposite ends, opposite side walls substantially parallel to each other and spaced apart to define an air bag retaining cavity with said body part side walls having a length greater than the distance said inflator holder projects into said air bag retaining cavity, and a plurality of end closure attachment preparations at each opposite end;
   an elongated inflator having an inflator chamber tube within the inflator holder of said body part; and
   first and second end closures attached to a respectively associated opposite end of said body part by means positioned in cooperative relation with the respective end closure attachment preparations, each of said first and second end closures further having an inflator chamber mating portion positioned to receive and support an associated one of the ends of said inflator, holding said inflator chamber tube in coaxial relation within the inflator holder.

13. The lightweight reaction canister assembly of claim 12 wherein said inflator chamber tube comprises a seamless extruded tube and wherein at least one of said end closures comprise an end base.

14. The lightweight reaction canister assembly of claim 12 wherein said inflator chamber tube comprises a drawn tube chamber and wherein at least one of said end closures comprise an end base.

15. The lightweight reaction canister assembly of claim 12 wherein said inflator chamber tube comprises an aluminum alloy of high strength.

16. The lightweight reaction canister assembly of claim 12 wherein said inflator holder comprises first and second side wall portions joined together by way of a concave base portion with said inflator holder defining a gap opening and wherein said inflator is of a thrust neutral type.

17. The lightweight reaction canister assembly of claim 12 wherein said inflator holder has a generally circular cross section and comprises first and second side wall portions joined together by way of a diffuser portion which bridges an arc of at least about 30°, as measured relative to said cross section between said first and second side wall portions of said inflator holder and which permits the passage of gas therethrough and wherein said inflator is of a directional type.

18. The lightweight reaction canister assembly of claim 12 wherein said inflator holder has a generally circular cross section and comprises first and second side wall portions joined together by way of a concave base portion and wherein said inflator holder defines a gap opening of at least about 45°, as measured relative to said cross section, and wherein said assembly additionally comprises an air bag retainer and diffuser and wherein said body part additionally comprises at least one attachment sleeve preparation adapted for the attachment of said air bag retainer and diffuser to said body part.

19. The lightweight reaction canister assembly of claim 12 additionally comprising an air bag assembly protective cover, wherein said inflator holder additionally comprises at least one integrally formed protective cover retaining preparation and wherein said cover is retained to said assembly by means in cooperative relation with said cover retaining preparation.

20. The lightweight reaction canister assembly of claim 19 wherein the retaining means comprises an elastomeric band placed about the outer edge of the cover and secured within said cover retaining preparation.

* * * * *